United States Patent [19]
Wannerskog et al.

[11] 4,069,435
[45] Jan. 17, 1978

[54] DEVICE FOR DETECTING RELATIVE MOTIONS IN A BEARING

[75] Inventors: Carl Axel Wannerskog, Goteborg; Sture Lennart Asberg, Savedalen, both of Sweden

[73] Assignee: SKF Industrial Trading and Development Company, N.V., Amsterdam W., Netherlands

[21] Appl. No.: 630,970

[22] Filed: Nov. 12, 1975

Related U.S. Application Data

[63] Continuation-in-part of Ser. No. 463,973, April 25, 1974, abandoned, which is a continuation-in-part of Ser. No. 243,494, May 26, 1972, abandoned.

[51] Int. Cl.$^2$ ............................................. H02K 17/42
[52] U.S. Cl. ................................ 310/168; 188/181 R; 308/187.1; 310/90
[58] Field of Search .................. 308/1 R, 201, 235, 2, 308/187.1; 310/168; 188/181 R

[56] References Cited
U.S. PATENT DOCUMENTS

| 3,494,682 | 2/1970 | Keller | 308/187.1 |
| 3,602,750 | 8/1971 | Boyer | 310/168 |
| 3,772,549 | 11/1973 | Cumming | 188/181 R |

Primary Examiner—Joseph F. Peters, Jr.
Assistant Examiner—Richard A. Bertsch
Attorney, Agent, or Firm—Eugene E. Renz, Jr.

[57] ABSTRACT

In a bearing assembly having at least two relatively rotatable members, a device having means for generating a magnetic field and means for sensing variation in the magnetic field, said bearing assembly including means for inducing variations in the magnetic flux which variations have a frequency proportional to the rotational speed of one member relative to other member, said inducing means being associated with one of said members and said means for sensing variations being associated with said other bearing member and seal means partly defined by said members completely sealing said inducing and sensing means.

8 Claims, 6 Drawing Figures (PRIOR-ART)

DEVICE FOR DETECTING RELATIVE MOTIONS IN A BEARING

This is a continuation-in-part application of our prior application, Ser. No. 463,973, filed Apr. 25, 1974 (now abandoned), which in turn is a continuation-in-part of our application, Ser. No. 243,494, filed May 26, 1972 (now abandoned), both entitled "DEVICE FOR DETECTING RELATIVE MOTIONS IN A BEARING".

The present invention relates to a bearing with at least two relatively rotatable elements and means for sensing the relative rotational speed of these elements.

In many instances it is of interest to measure relative motions between two relatively rotatable elements, e.g., when measuring speed and acceleration, regulating rotational speed and in so-called anti-lock devices in vehicle brakes.

For this purpose it is previously known to use devices which generate a magnetic field, which field is influenced to vary in a frequency which is proportional to the rotational speed of one element relative to another element, and devices which register this frequency.

A device of the above type has been employed as part of the electronic control circuit in an anti-locking device for brake systems for vehicles. The components and details of the system are illustrated and set forth on pages 338, and 339 of the August, 1970 publication entitled "Automobile Engineer" which is hereby incorporated in its entirety by reference and in which the sensing device is suitably placed on a brake caliper house and where a magnetic flux is affected by a toothed ring attached to the wheel hub.

The portion of the electronic circuitry which is pertinent to the present application includes a magnetic pick-up mounted on the brake caliper which is energized by a toothed ring attached to the hub. The pick-up is a device for generating a magnetic field and means for sensing variations in the magnetic field and the toothed ring is a means for inducing variations in the magnetic flux. By this arrangement since the frequency of the pulses transmitted by the pick-up is proportional to the speed of the wheel, the system is sensing speed continuously and thus information needed to determine acceleration and deceleration is available. The circuit is illistrated diagramatically in block form in FIG. 4 of the drawing. Signals from the system as a result of speed changes control operation of a solenoid valve selectively to control flow of fluid in the braking system. For example, to obtain the rate of deceleration, the speed signal which is generated by a coil on the stationary magnet, is differentiated and compared with a reference deceleration equivalent to that encountered when wheel locking is imminent. When this actual deceleration of the wheel exceeds the predetermined reference deceleration, the solenoid is energized causing the valve to be opened and closed rapidly. When the valve is closed, fluid is diverted from the wheel cylinder where the pressure is temporarily reduced and diverted to the pump when the anti-locking device is operating.

One great disadvantage with this and similar devices is that contaminations of different kinds or corrosion may easily occur between the sensor and the toothed ring, which diminishes the accuracy of the device, since the contaminations may influence the magnetic field and/or block the sensing device. Furthermore, this device will be exposed to heat from the brake disc and brake calliper, which may further diminish the accuracy and security of function.

These problems are solved by the present invention, which relates to a bearing comprising two relatively rotatable elements and is characterized by that it comprises means for sensing variations in a medium, which variations have a frequency which is proportional to the relative rotational speeds of the elements and which means is situated in or debounches in a closed room which is limited partly by bearing elements and partly by a cover or similar seal co-operating with said elements.

By this invention a completely closed device is achieved in which the sensing means is protected against contaminations. The lubricant which may possibly be present can only affect the sensing device within well defined limits, which is very easy to take into account.

The device is now to be described in detail with reference to the accompanying drawings in which.

Figure 1:
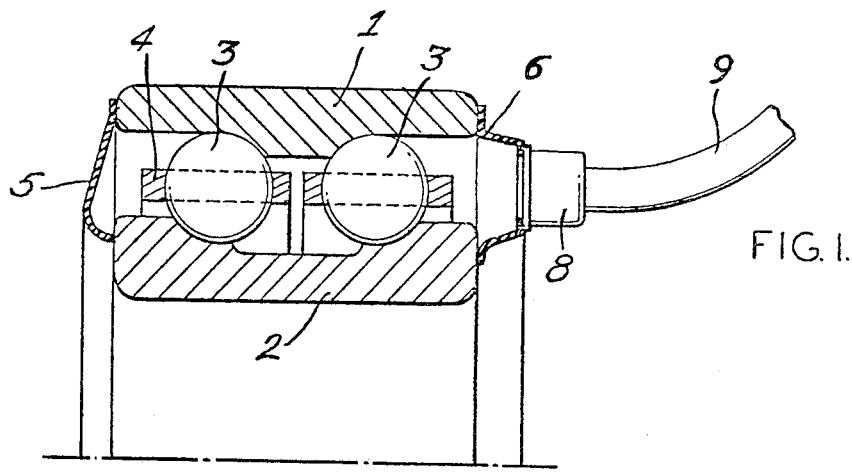
FIG. 1 shows an embodiment of the invention in connection to a double-row angular contact ball bearing.
Figure 2:
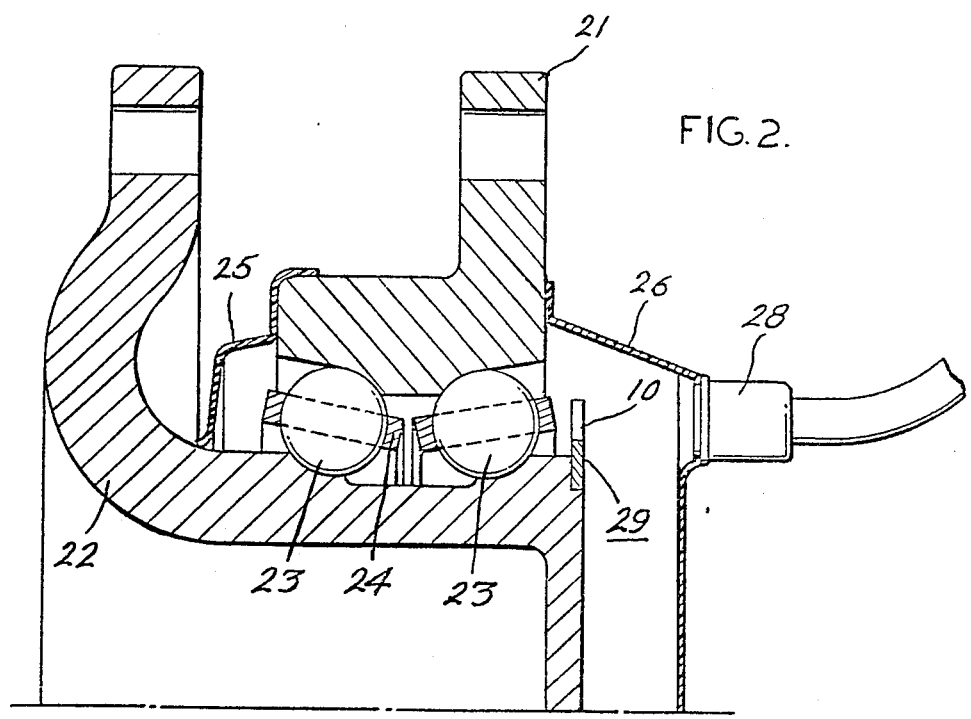
FIG. 2 shows another embodiment of the invention in connection to another type of wheel bearing.
Figure 1A:
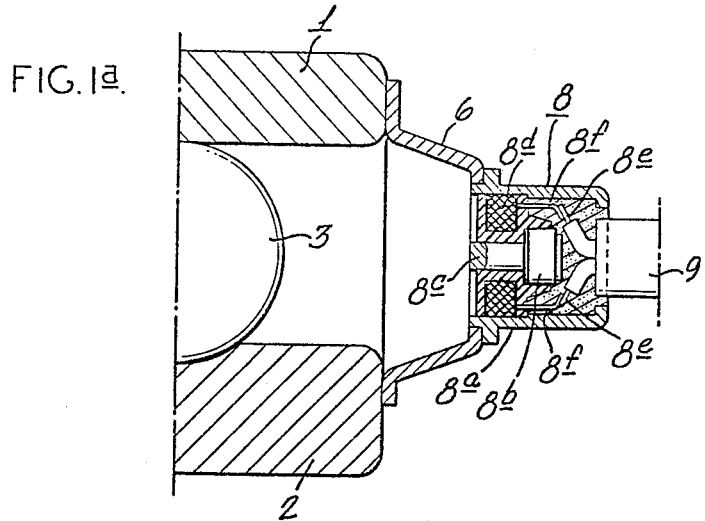
FIG. 1a is an enlarged fragmentary sectional view showing means for generating a magnetic field and sensing means for sensing variations in the field.
Figure 2A:
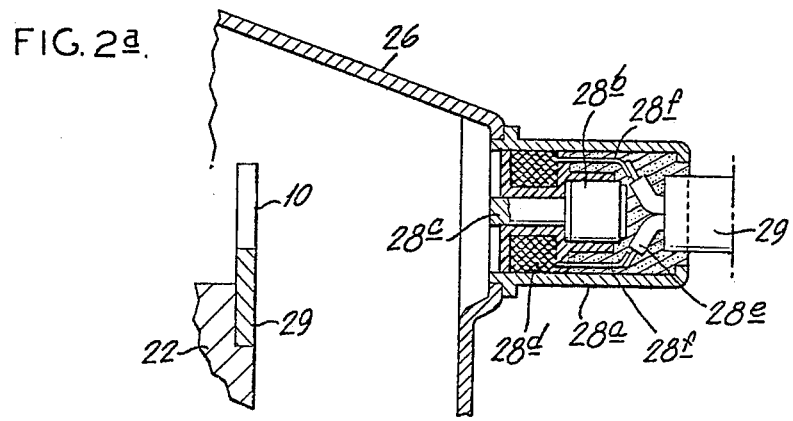
FIG. 2a is a fragmentary sectional view similar to FIG. 1a showing generating and sensing means for the embodiment of the invention illustrated in FIG. 2.
Figure 4:
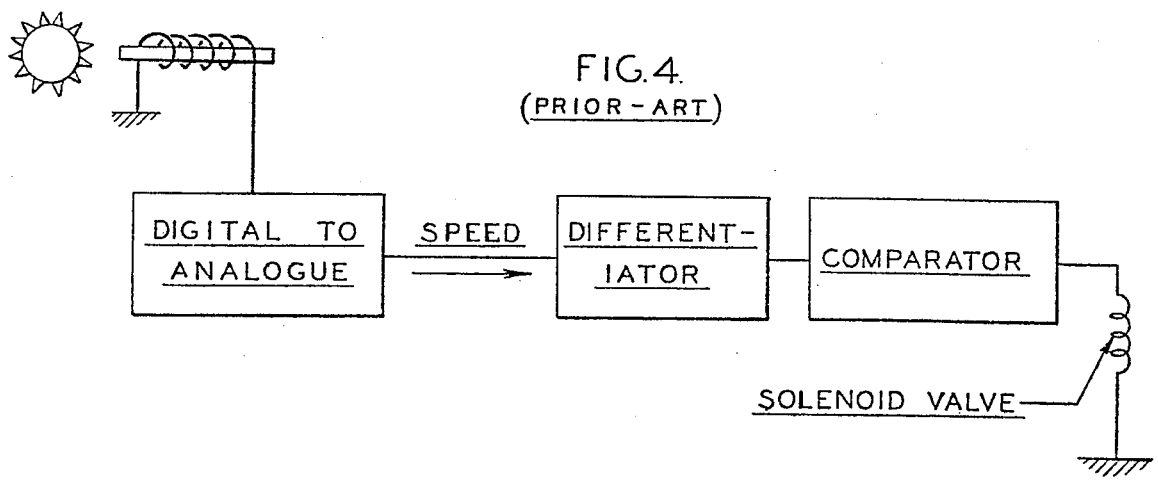
FIG. 4 is a schematic showing of a prior art system for sensing; for example, relative rotational speeds.

FIG. 1 shows a section of a rolling bearing comprising an outer ring 1 and an inner ring 2 and two intermediate rows of balls 3 which are kept in position by the cage 4. The bearing is provided with seals 5, 6, whereby the seal 6 has an opening for connection to the end of a device 8 which is provided with means for generating a magnetic field and means for sensing the variations of the magnetic field which occur when the rolling bodies successively pass through the field. The device 8 as illustrated in FIG. 1a comprises a cup-shaped housing 8a mounted on the seal 6 which supports therein a permanent magnet 8b having a pole piece 8c and a coil 8d. The leads 8e of conductor 9 are secured to terminals 8f of the coil 8d. Thus, any variations in the field generated induce voltage in the coil 8d which in turn appear as electrical impulses at the terminals. The impulses thus obtained are transmitted by a conductor 9 for further processing, which depends on the purpose of sensing the relative motions of the bearing, e.g., for actuating an anti-lock device for brakes and/or a tachometer. Since the motion of the rolling bodies relative to one bearing ring is proportional to the relative motion of the two bearing rings, the frequency of the variations of the magnetic field is also proportional to the relative motion of the bearing rings. In this embodiment the seal 6 is suitably fixed to the outer ring and the bearing has a rotating inner ring 2. The device 8 may be fixed or detachably connected to the seal 6. In FIG. 2 another embodiment of the invention is shown in a bearing with a non-rotating outer ring 21 provided with sealing means 25, 26 and a rotating inner ring 22. The bearing has two rows of balls 23 which are spaced by the cage 24. The seal 26 is in the same manner as in FIG. 1 provided with an aperture for connecting a device 28 of the same kind as the device 8 in FIG. 1. In a bearing according to FIG. 2, the action of the seal is completely static (it may be integral with the outer ring), and is therefore especially suitable for supporting the device 28. As illustrated in FIG. 2a, the generating and sensing device 28 is similar to that described previously and includes a cup-shaped housing 28a and permanent magnet 28b having a pole piece 28c and a coil 28d supported in the housing. The coil terminals 28f are connected to the leads 28e of a conductor 29. The variations of the magnetic field is achieved in this case by a ring 29 provided with teeth 10, see FIG. 3, which ring is fixed to the rotatable bearing ring, and in which the teeth are of such a material that the magnetic field is affected when the teeth pass through it.

Also other embodiments are possible within the scope of the claims. Thus, the invention is not limited to rolling bearings but it may also be used in sliding bearings of different kinds. It is also possible to place the devices 8, 28 in another way than shown in the above embodiments. For example, it is principally possible to fix the sensing device on the rotating bearing ring.

Figure 3:
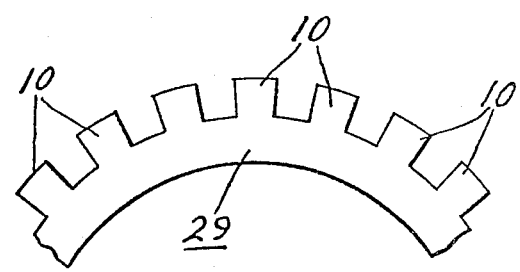
FIG. 3 shows a detail of the device according to FIG. 2.

In those cases when variations in a magnetic field is senses, these variations may be induced by different kinds of rotating rings according to the same principle as in FIGS. 2 and 3.

Such rings may be either of a ferromagnetic material or of a material like, for instance, copper (Cu); in the latter case the magnetic field is affected by the whirl currents which are induced in the ring by the magnetic field. Instead of a metal ring, for instance, a synthetic resin ring may be used in or on which a metallic pattern is arranged which may be ferromagnetic or of some other kind, which pattern crosses the magnetic flux by the rotation of the ring. In rolling bearings with a cage, such a ring may be fixed to the cage, or the cage itself may be provided with teeth or a metallic pattern. Alternatively, the cage may be provided with other means for inducing the variations in the magnetic flux.

Also, other methods for achieving the desired impulses than using magnetism are of course thinkable within the scope of the present invention.

We claim:

1. In a bearing assembly having at least two relatively rotatable bearing members spaced apart to define an annular space for a plurality of rolling elements, a device having means for generating a magnetic medium and means for sensing variation in the magnetic medium, said bearing assembly including means for inducing variations in the magnetic flux which variations have a frequency proportional to the rotational speed of one member relative to the other member, said means for generating variations being associated with one bearing member and seal means including a circumferentially extending shield at opposite axial ends of said annular space, said sensing means mounted in one of said shield members, each of said shields secured to one of said bearing members and in sealing contact with the other bearing member and enclosing an annular space including said rolling elements and said generating and sensing means thereby providing a sealed environment therefor.

2. Bearing according to claim 1, in which at least one sealing device is fixed to one of the bearing elements, characterized by that the means for sensing the variations in the medium is situated on that sealing device.

3. Bearing according to claim 2, characterized by that the sealing device is provided with an opening in which the sensor is detachably fitted.

4. Bearing according to claim 1, in which the medium is a magnetic field, characterized by that the magnetic field is generated by a permanent magnet.

5. In a bearing assembly having at least two relatively rotatable bearing members spaced apart to define an annular space for a plurality of rolling elements, a device having means for generating a magnetic field and means for sensing variation in the magnetic field, the rolling elements of said bearing assembly inducing variations in the magnetic flux which variations have a frequency proportional to the rotational speed of one member relative to the other member, said means for sensing variations being associated with one bearing member and seal means including a circumferentially extending shield at opposite axial ends of said annular space, each of said shields secured to one of said bearing members and in sealing contact with the other bearing member, said inducing and generating means mounted in one of said shield members whereby a sealed environment is provided for said inducing and generating means.

6. In a bearing assembly having at least two relatively rotatable bearing members spaced apart to define an annular space for a plurality of rolling elements, a cage for the rolling elements, a device having means for generating a magnetic field and means for sensing variation in the magnetic field, characterized by said cage having means for cutting the magnetic field lines, which means consists of a material which affects the shape of the magnetic field to produce variations having a frequency proportional to the rotational speed of one member relative to the other member, said means for sensing variations being associated with one bearing member and seal means including a circumferentially extending shield at opposite axial ends of said annular space, each of said shields secured to one of said bearing members and in sealing contact with the other bearing member, said generating means mounted in one of said shields whereby a sealed environment is provided for said generating means.

7. Bearing according to claim 6, characterized in that the cutting means consists of radial projections arranged on the cage.

8. The combination comprising a bearing assembly having inner and outer relatively rotatable ring members spaced apart to define an annular space therebetween, a plurality of rolling elements in the annular space rotatable circumferentially relative to said rings, a device mounted adjacent said annular space for generating a magnetic medium and means for sensing variations in the magnetic medium, said rolling elements during operation of the bearing successively passing through said magnetic medium producing impulses sensed by said sensing means, motion of said rolling elements relative to one of said rings being proportional to the relative rotation of said rings whereby the frequency of the variations of the magnetic medium is proportional to the relative motion of said ring members and seal means including a circumferentially extending shield at opposite axial ends of said annular space, said sensing means mounted in one of said shield members, each of said shields secured to one of said bearing members and in sealing contact with the other bearing member and enclosing an annular space including said rolling elements and said generating and sensing means thereby providing a sealed environment therefor.

* * * * *